United States Patent [19]

Baumel

[11] 3,740,525

[45] June 19, 1973

[54] PROCESS OF MAKING FULLY AUSTENITIC WELDED JOINTS WHICH ARE INSUSCEPTIBLE TO HOT CRACKING

[75] Inventor: Anton Baumel, Lank/Niederrhein, Germany

[73] Assignee: Bohler & Co., AG, Kalsfenberg, Austria

[22] Filed: Nov. 30, 1970

[21] Appl. No.: 93,878

[30] Foreign Application Priority Data
Nov. 29, 1969  Germany............... P 19 60 025.0

[52] U.S. Cl. ................................. 219/137, 219/145
[51] Int. Cl. ............................................. B23k 9/00
[58] Field of Search ................... 219/137, 145, 76, 219/74, 146; 75/125, 128 W

[56] References Cited
UNITED STATES PATENTS

| | | | |
|---|---|---|---|
| 3,554,791 | 1/1971 | Johnson et al.............. | 219/146 X |
| 3,201,233 | 8/1965 | Hull............................. | 75/128 T |
| 3,522,037 | 7/1970 | Greene et al................ | 75/128 W |
| 3,306,736 | 2/1967 | Rundell....................... | 75/125 |
| 3,192,040 | 6/1965 | Goda et al................... | 75/128 T |

Primary Examiner—J. V. Truhe
Assistant Examiner—George A. Montanye
Attorney—Holman & Stern

[57] ABSTRACT

A fully austenitic base material composed of 0.001–0.2 percent carbon, 0.1–5.0 percent silicon, 0.25–10.0 percent manganese, 15.0–25.0 percent chromium, 3.5–6.0 percent molybdenum, 8.0–30.0 percent nickel, 0.01–3.0 percent copper, 0.1–0.35 percent nitrogen, balance iron and inevitable impurities is joined with the aid of an electrode comprising a filler material composed of 0.001–0.2 percent carbon, 0.1–5.0 percent silicon, 0.25–10.0 percent manganese, 15.0–25.0 percent chromium, 3.5–6.0 percent molybdenum, 8.0–30.0 percent nickel, 0.01–3.0 percent copper, 0.1–0.35 percent nitrogen, balance iron and inevitable impurities to form a weld composed of 0.001–0.2 percent carbon, 0.1–5.0 percent silicon, 0.25–10.0 percent manganese, 15.0–25.0 percent chromium, 3.5–6.0 percent molybdenum, 8.0–30.0 percent nickel, 0.01–3.0 percent copper, 0.1–0.35 percent nitrogen, balance iron and inevitable impurities.

3 Claims, No Drawings

PROCESS OF MAKING FULLY AUSTENITIC WELDED JOINTS WHICH ARE INSUSCEPTIBLE TO HOT CRACKING

This invention relates to a process of making fully austenitic welded joints which are insusceptible to hot cracking and have a yield point of at least 30 kilograms per square millimeter, an elongation of at least 35 percent and a high resistance to corrosion, particularly to pitting, intercrystalline corrosion and stress crack corrosion.

It is known that austenitic chromium-nickel steels and chromium-nickel-molybdenum steels have a high tendency to develop hot cracks as they are welded. For this reason, the welding electrodes used in welding such steels or the resulting welds always contained about 3–15 percent delta-ferrite. Particularly with molybdenum-containing steels, which have a particularly high resistance to corrosion, the strong tendency of delta-ferrite to decompose at the welding temperature involves great disadvantages residing in an embrittlement and a great decrease in the resistance of the weld to corrosion compared to the base material.

It is an object of the invention to provide a process of making welded joints which are fully austenitic yet insusceptible to hot cracks and in which the excellent properties of the base material are preserved in a very high degree, particularly as regards the yield point, the elongation and the resistance to corrosion.

The process according to the invention is characterized in that a fully austenitic base material consisting of
0.001–0.2% C
0.1–5.0% Si
0.25–10.0% Mn
15.0–25.0% Cr
3.5–6.0% Mo
8.01–30.0% Ni
0.01–3.0% Cu
0.1–0.35% N
balance Fe and inevitable impurities is welded with the aid of an electrode which is similar in kind to form a weld which is similar in composition to the base material and consists preferably of up to 0.1% C, 0.1–2.5% Si, 0.25–6.0% Mn, 15.0–22.0% Cr, 3.5–6.0% Mo, 8.0–20.0% Ni, 0.01–2.0% Cu, 0.1–0.30% N, balance iron and inevitable impurities.

For this purpose, the fillers used in making the welded joint have the following composition related to the weight of the metallic constituents and any carbon and silicon which are present:
0.001–0.2% C, preferably up to 0.1% C,
0.1–5.0% Si, preferably 0.1–2.5% Si,
0.25–10.0% Mn, preferably 0.25–6.0% Mn,
15.0–25.0% Cr, preferably 15.0–22.0% Cr,
3.5–6.0% Mo,
8.0–30.0% Ni, preferably 8.0–20.0% Ni,
0.01–3.0% Cu, preferably 0.01–2.0% Cu,
0.1–0.35% N, preferably 0.1–0.30% N,
balance iron and inevitable impurities.

The invention will now be explained more in detail with reference to examples.

Example 1

Sheet metal elements which were intended particularly for use in the construction of pressure containers and had a thickness of 20 millimeters and consisted of steel composed of 0.038% C, 0.75% Si, 1.38% Mn, 0.024% P, 0.004% S, 18.10% Cr, 4.40% Mo, 13.3% Ni, 0.15% Cu and 0.14% N, balance Fe, were used to make welded joints with the aid of an electrode having a calcium-base covering and a core which had the same composition as the sheet metal. Electrodes 2.25 millimeters in diameter were used for the root pass, electrodes 3.25 millimeters in diameter for the seam passer, and electrodes 4.0 millimeters in diameter for the cover passer. The weld had the following composition: 0.051% C, 0.38% Si, 1.74% Mn, 0.028% P, 0.007% S, 16.8% Cr, 4.38% Mo, 13.5% Ni, 0.14% Cu, and 0.16% N, balance Fe.

The following table contains data relating to the strength values found for the base material (A), the pure weld (B), and specimens cut out at right angles to the seam weld (C) in tests carried out at room temperature:

TABLE 1

| | A | B | C |
|---|---|---|---|
| Yield point | 35.6 | 37.7 | 38.9 kg./sq.mm. |
| Ultimate tensile stress | 70.5 | 63.7 | 67.5 kg./sq.mm. |
| Elongation (1 = 5 d) | 45 | 43 | 37 % |
| Reduction in area at break | 67 | 55 | 61 % |

Example 2

Welded joints were made in an argonarc process (TIG) using sheet metal elements which were intended for use in the construction of evaporators for radioactive sewage and inert gas welding electrode wire which had a thickness of 1.5 millimeters and was made from the same material composed of 0.035% C, 0.63% Si, 1.31% Mn, 0.018% P, 0.011% S, 17.31% Cr, 4.64% Mo, 13.59% Ni, 0.15% Cu, and 0.16% N, balance Fe.

Tests carried out at room temperature revealed the mechanical properties presented in Table 2, in which the letters A, B, and C have the same meanings as in Table 1.

TABLE 2

| | A | B | C |
|---|---|---|---|
| Yield point | 35.2 | 37.4 | 38.7 kg./sq.mm. |
| Ultimate tensile stress | 71.5 | 68.2 | 78.0 kg./sq.mm. |
| Elongation (1 = 5 d) | 44 | 42 | 40.5 % |
| Reduction in area at break | 57 | 52 | 47 % |

Samples taken from the welded joints made in accordance with Examples 1 and 2 were subjected to the so-called Husy Test, in which the samples are treated with boiling concentrated nitric acid for three periods of 48 hours and the resulting weight loss is determined. In these tests, the attack of the acid resulted in a removal of material at a very low rate, which was the same in each boiling treatment period and agreed with the rate which had been determined for the base material. This shows that the weld has the same resistance to corrosion as the base material.

All welded joints were checked for hot cracks by the dye penetration method and by an inspection of metallographic polished sections. No hot cracks were detected in these checks.

What is claimed is:

1. A process of making fully austenitic welded joints which are insusceptible to hot cracking which process comprises providing a fully austenitic base material consisting essentially of 0.001–0.2% carbon, 0.1–5.0% silicon, 0.25–6.0%. manganese, 15.0–25.0% chromium, 3.5–6.0% molybdenum, 8.0–30.0% nickel, 0.01–3.0% copper, 0.1–0.35% nitrogen, balance iron and inevitable impurities; providing an electrode comprising a filler material consisting essentially of 0.001–0.2% carbon, 0.1–5.0% silicon, 0.25–6.0% manganese, 15.0–25.0% chromium, 3.5–6.0% molybdenum, 8.0–30.0% nickel, 0.01–3.0% copper, 0.1–0.35% nitrogen, balance iron and inevitable impurities; fusion welding said base material with said electrode to form a fully austenitic weld consisting essentially 0.001–0.2% carbon, 0.1–5.0% silicon, 0.25–6.0% manganese, 15.0–25.0% chromium, 3.5–6.0% molybdenum, 8.0–30.0% nickel, 0.01–3.0% copper, 0.1–0.35% nitrogen, balance iron and inevitable impurities, which weld is substantially free of hot cracks, has a yield point of at least 30 kilograms per square millimeter and an elongation of at least 35%.

2. A process as set forth in claim 1, wherein the resultant weld composition consists essentially of up to 0.1% carbon, 0.1–2.5% silicon, 0.25–6.0% manganese, 15.0–22.0% chromium, 3.5–6.0% molybdenum, 8.0–20.0% nickel, 0.01–2.0% copper, 0.1–0.30% nitrogen, balance iron and inevitable impurities.

3. A process as set forth in claim 1, in which said filler material is composed of up to 0.1% carbon, 0.1–2.5% silicon, 0.25–6.0% manganese, 15.0–22.0% chromium, 3.5–6.0% molybdenum, 8.0–20.0% nickel, 0.01–2.0% copper, 0.1–0.30% nitrogen, balance iron and inevitable impurities.

* * * * *